United States Patent [19]

Webster

[11] Patent Number: 5,307,351
[45] Date of Patent: Apr. 26, 1994

[54] DATA COMMUNICATION APPARATUS FOR ADJUSTING FRAME LENGTH AND METHOD OF OPERATING SAME

[75] Inventor: James M. Webster, Harvest, Ala.

[73] Assignee: Universal Data Systems, Inc., Huntsville, Ala.

[21] Appl. No.: 749,835

[22] Filed: Aug. 26, 1991

[51] Int. Cl.⁵ .............................................. H04J 3/24
[52] U.S. Cl. .................................................. 370/94.1
[58] Field of Search ............... 370/110.1, 94.1, 82, 370/83, 24, 99; 371/32, 33

[56] References Cited

U.S. PATENT DOCUMENTS

| 4,125,808 | 11/1978 | Graham | 379/59 |
|---|---|---|---|
| 4,519,068 | 5/1985 | Krebs et al. | 370/82 |
| 4,771,391 | 9/1988 | Blasbalg | 370/85.2 |
| 4,949,333 | 8/1990 | Gulick et al. | 370/32 |
| 4,970,714 | 11/1990 | Chen et al. | 370/94.1 |
| 5,007,051 | 4/1991 | Dolkas et al. | 370/110.1 |
| 5,027,348 | 6/1991 | Curry, Jr. | 370/82 |
| 5,050,166 | 9/1991 | Cantoni et al. | 370/82 |
| 5,088,112 | 2/1992 | Pyhalammi et al. | 370/99 |

OTHER PUBLICATIONS

Andrew S. Tanenbaum, *Computer Networks* (Second Edition), Prentice Hall, 1988, Chapter 4, "The Data Link Layer".

J. A. Field, "Efficient Computer Communications," Proc. IEE, vol. 123, Aug. 1976, pp. 756–760.

*Primary Examiner*—Douglas W. Olms
*Assistant Examiner*—Ajit Patel
*Attorney, Agent, or Firm*—Wayne J. Egan

[57] ABSTRACT

Data communication apparatus (DCA) receives digital data from data terminal apparatus (DTA) and transmits the digital data assembled in the form of frames over a communication medium. Included in the DCA is apparatus for adjusting the length of the data frames being assembled based on a determined degree of impairment of the communication medium. A corresponding method of adjusting the length of the data frames in the data communication apparatus is also included.

16 Claims, 3 Drawing Sheets

DATA COMMUNICATION APPARATUS FOR ADJUSTING FRAME LENGTH AND METHOD OF OPERATING SAME

FIELD OF THE INVENTION

This invention relates generally to data communication systems and more particularly to data communication apparatus for determining an optimum frame length for data communication over a communication medium and a method of operating same.

BACKGROUND OF THE INVENTION

In its simplest form, a point-to-point data communication system is comprised of first and second data terminal elements (DTE's), first and second data communication elements (DCE's), and a communication link. The DTE's (e.g. computers, terminals, etc.) communicate data information with each other over the transmission line or communication medium (e.g. telephone line, RF link, etc.). The DCE's, which may include modems, multiplexers, terminal adapters and line drivers, act as an interface between their respective DTE's and the communication medium for the exchange of such data information.

In most cases, the communications link is not perfect, and impairments such as noise on the link may cause the data traversing the link to be corrupted or even lost. Impairments can be caused by a number of sources. For example, a telephone line's transmission quality can be degraded by poor quality equipment in the network, poor wire routing, crosstalk from adjacent lines, bad weather (especially lightning), inferior electrical connections, poor microwave or satellite reception, etc. Techniques such as filtering and equalization can compensate for some of these impairments; however, these techniques cannot guarantee that all impairments will be compensated for and that all data will be received correctly.

Link level protocols may be employed in the DCE to detect and correct errors which are introduced in the data exchange as a result of impairments on the transmission line. LAPM (Link Access Procedure for Modems) and MNP (Microcom Networking Protocol) are examples of link level protocols which are commonly used for modem applications. These protocols group data into "frames" which include not only the data itself, but also error detection and control information and start and stop information, which information is collectively referred to as "framing overhead." If a frame is corrupted or lost, i.e. determined to be unacceptable during transmission, the receiving DCE can detect the error and request the transmitting DCE to retransmit the bad frame using the employed protocol. Alternatively, the receiving DCE may simply fail to acknowledge receipt of an unacceptable frame which will result in retransmission by the transmitting DCE after a predetermined period of time.

Throughput is one of the primary measures of a data communication system's performance and represents the effective rate, measured in bits-per-second, at which the system transmits and receives data. Although protocols provide error detection and correction, the overhead introduced by the protocols reduces throughput and therefore performance.

The overhead in error-control protocols such as LAPM or MNP includes framing overhead and retransmission overhead. As previously alluded to, framing overhead comprises the fixed number of octets per frame that do not represent data. The amount of framing overhead depends upon frame size. That is, large frames have less frame overhead because while the number of octets which do not represent data remains constant, the number of data octets is increased.

Retransmission overhead is the transmission time lost when frames are not received correctly and have to be retransmitted. The amount of retransmission overhead depends on (1) transmission line condition (i.e. the degree of impairment on the line), and (2) frame size. That is, the smaller the frame, the greater the probability that it will be received correctly making retransmission unnecessary.

Most error control protocols, including LAPM and MNP, use a fixed frame size which reflects a compromise between the seemingly inconsistent goals of (1) reducing framing overhead by increasing overall frame length, and (2) minimizing the number of retries by reducing frame length. LAPM utilizes a default frame size of 128 octets, although larger frame sizes may be used if agreed upon by both modems. The MNP protocol utilizes a maximum frame size of 256 octets. The temptation to use larger frame sizes to reduced relative overhead must be tempered with the knowledge that throughput would be dramatically reduced on even marginally noisy lines if the large frames had to be retransmitted.

What is needed is a method and apparatus for dynamically reducing the total protocol overhead to the lowest practical level, thus increasing the throughput of a point-to-point communication system which employs error control protocols. When the transmission line is "clean", the system should send larger frames. As the line gets "noisier", the system should transmit smaller and smaller frames since smaller frames have the best chance of arriving without errors and therefore would not require retransmission. Simply stated, what is needed is a technique for dynamically adjusting frame length based on the quality of the transmission line.

SUMMARY OF THE INVENTION

Data communication apparatus (DCA) which is interfaceable with data terminal apparatus (DTA) and a communication medium exchanges digital data received from the DTA over the communication medium in the form of assembled frames. In accordance with the present invention, the data communication apparatus includes means for determining a degree of impairment of the communication medium, and means for adjusting the length of the data frames assembled based on the determined degree of impairment. In one embodiment, the data communication apparatus determines a number of unacceptable transmissions of data frames over the communication medium as a degree of impairment and adjust the length of the data frames based on a function of the number of unacceptable transmissions. A corresponding method of adjusting the length of the data frames based on the determined degree of impairment is considered another aspect of the present invention.

DESCRIPTION OF THE PREFERRED EMBODIMENT

Figure 1:
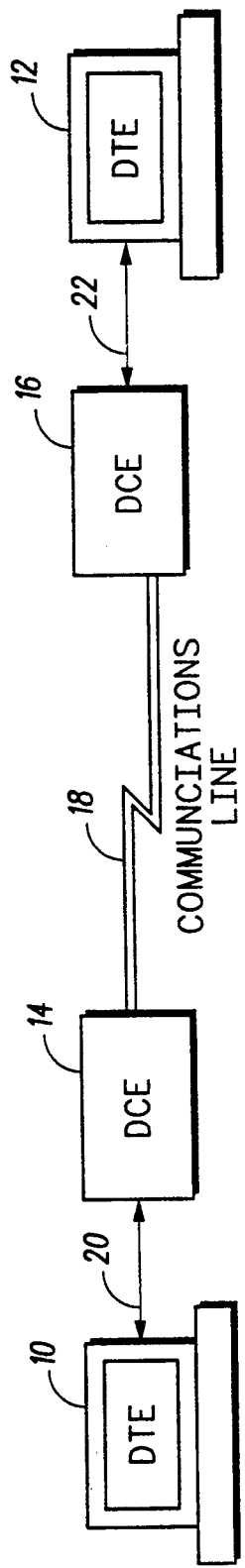
FIG. 1 is a block diagram of a typical data communication system.

FIG. 1 is a block diagram of a typical point-to-point data communication system. It consists of two data terminal elements (DTE's) 10 and 12, two data communication elements (DCE's) 14 and 16, and a communications medium 18. The DTE's 10 and 12 may be computers, terminals, etc. which desire to communicate with each other. The DCE's 14 and 16 may include modems, multiplexers, terminal adapters, and line drivers, and are coupled directly to opposite ends of communication line 18. DTE 10 is in two-way communication with DCE 14 via line 20, and DTE 12 is in two-way communication with DCE 16 via line 22. Communication medium 18 may be a telephone line, RF link, or other form of communication link over which data may travel. Such data communication systems are well known and further discussion is not deemed necessary.

As discussed in the Background section, communication line 18 is typically not perfect, and impairments such as noise can cause data traversing the line to be corrupted or lost. For this reason, link level protocols to detect and correct data transmission errors are employed by the DCE's which group data to be transmitted into "frames" which include not only the data itself, but also error detection and control information and start and stop information.

Figure 2:
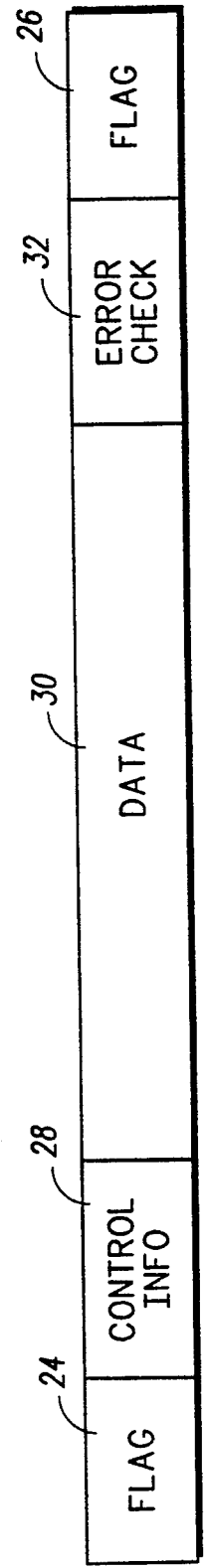
FIG. 2 illustrates a typical error correcting protocol frame.

FIG. 2 illustrates a typical error correcting frame utilized in link level protocols such as LAPM and MNP, for example. As can be seen, the frame commences with a start flag 24 and terminates with a stop flag 26, each comprised of one or more characters, and further includes one or more characters of control information 28 (for example, identifying the frame as a particular frame in a sequence of frames), a number of data characters 30 and CRC error check characters 32. The framing overhead referred to above, comprises flags 24 and 26, control information 28, and the error check characters 32. In some protocols, the ending flag from one frame may also serve as the starting flag for the next frame. In systems which employ such link level protocols, methods already exist and are well known for detecting bad frames or missing frames, and requesting retransmission of the bad or missing frames, using the Error Check and Control information contained in the data protocol frame. For more information on these methods see, for example, Computer Networks (Second Edition), by Andrew S. Tanenbaum, Prentice Hall, 1988, particularly Chapter 4, entitled "The Data Link Layer."

As stated previously, when communications line 18 (FIG. 1) is "clean", the system should send large frames (the maximum amount of data) since large frames have the least relative overhead. When the line is noisy, however, the system should send small frames, since they have the best chance be arriving error free. In his paper Efficient Computer Communications, Proc. IEE, Vol. 123, August 1976, pp. 756-760, J. A. Field describes the effect of the bit error rate on the throughput of link protocols for various frame sizes, and provides several formulae for computing the optimum frame size as a function of the bit error rate of the transmission line. His formulae assume knowledge of the hard bit error rate of the transmission line. Unfortunately, the actual error rate of a transmission line is very difficult to determine while the data communication system is on line and transmitting data. Furthermore, it is not desirable to stop sending data in order to measure the line condition since this would result in reduced throughput.

What is needed is a method to approximate the degree of impairment (bit error rate) of the line indirectly. It is recognized that the number of requests for frame retransmissions or lack of acknowledgements which result in retry requests that occur is directly proportional to the degree of impairment of the line or line error rate. See Tanenbaum. If the line is noisy, a larger number of frames will contain errors which will in turn be detected by the receiver and have to be retransmitted by the sender via a retry request, using the existing protocol mechanisms. If the number of retry requests can be counted, the count can be used to estimate line condition or degree of impairment. Accordingly, if a large number of retry requests occur, it can be assumed that frames being sent are being lost due to noise, and the size of the frames that are being sent can be reduced in order to compensate for the noisy line. Conversely, if no retry requests occur, the maximum allowable frame size can be employed. Thus, the inventive technique adjusts the frame length or size to an optimum for current line impairment conditions based on a "retry ratio"; i.e. the number of frame retry requests (retransmissions) that have occurred during the last predetermined number (n) of frames sent.

The following represents the derivation of a formula which relates frame size to the average error rate. This derivation is based on the following assumptions. First, to maximize throughput, the number of octets that are lost (on average) due to retransmissions should be less than or equal to the number that are lost as a result of frame overhead. That is, $$\text{Retry Overhead} \leq \text{Frame Overhead}. \quad (1)$$

The frame overhead is simply the number of octets per frame that are not data (including flags, address and control information, and error detection information). Since the retry overhead (number of octets lost due to retransmission) is, on the average equal to the retry ratio times the frame size, then equation (1) becomes $$\text{Retry Ratio} \times \text{Frame Size} \leq \text{Frame Overhead}, \quad (2)$$

where the retry ratio is number of frames lost (retransmitted) divided by the total number of frames sent (new and retransmitted) as shown in equation (3) below:

$$\text{Retry Ratio} = (\text{Frames Lost})/(\text{Frames Sent}). \quad (3)$$

Combining equations (2) and (3) gives the general equation (4) for obtaining the optimum frame size:

$$\text{Frame Size} \leq (\text{Frame Overhead} \times \text{Frames Sent}) / \text{Frames Lost} \quad (4)$$

In LAPM, the number of overhead octets is 6 (one flag, one address, two control, and two CRC). The field which contains the data is called the I-field (information field). The total link of the frame is the I-field plus the number of overhead octets. Thus, referring back to equation 2, the frame overhead becomes 6 yielding equation (5) found below:

$$\text{Frame Size} \leq 6 \times \text{Frames Sent/Frames Lost.} \qquad (5)$$

Equation 5 represents the optimum frame size or length for LAPM as a function of the ratio between the number of frames sent and the number of frames lost (i.e. the number of frames retransmitted). Thus, optimum frame size is obtained by multiplying the total number of frames sent by the frame overhead, which is 6 for the instant example, and dividing the result by the total number of frames lost or unacceptable.

Figure 3:
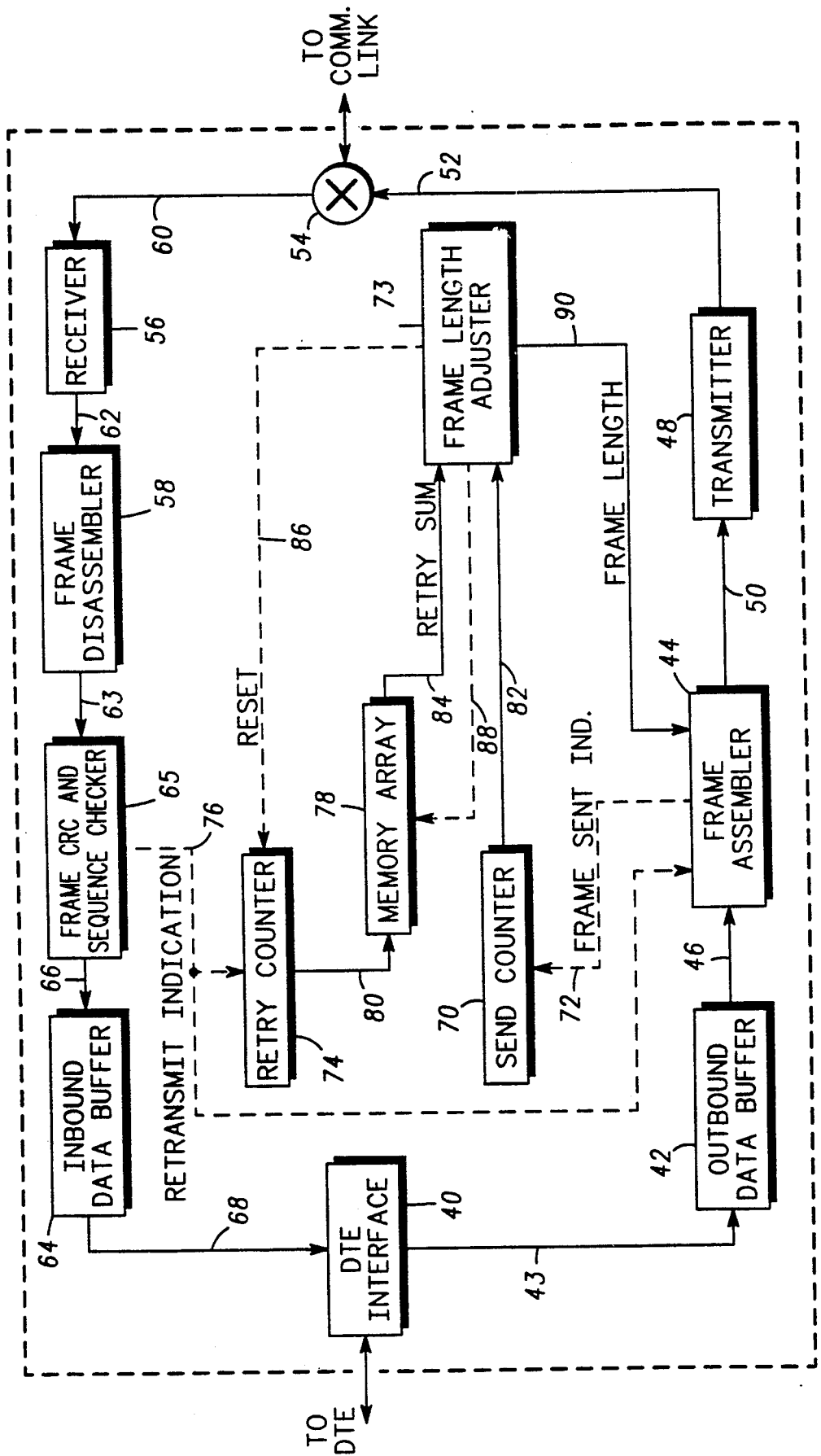
FIG. 3 is a functional block diagram of data communication apparatus suitable for embodying the principles of the present invention.

FIG. 3 depicts a functional block diagram schematic of data communication apparatus suitable for use in the data communication system of FIG. 1 and for embodying the principles of the present invention. Referring to FIG. 3, the DCA is interfaceable to data terminate equipment (DTE) through a conventional DTE interface 40 which may be, for the present embodiment, an RS-232C type interface, for example. The DTE interface 40 is coupled to an outbound or transmit data buffer 42 over path 43. The buffer 42, in turn, is coupled to a frame assembler 44 over path 46. A conventional transmitter 48 is coupled between the frame assembler 44 by path 50 and the communication line or medium by path 52 and a conventional hybrid coupler 54. On the receiving end, a conventional receiver 56 is coupled between the hybrid coupler 54 and a frame disassembler 58 by paths 60 and 62, respectively. In turn, the frame disassembler 58 is coupled to a frame CRC and sequence checker 65 by path 63. In turn, the frame CRC and sequence checker 65 is coupled to an inbound or receive data buffer 64 which is coupled to the DTE interface 40 utilizing paths 66 and 68, respectively.

Further included is a "frame sent" counter 70 coupled to the frame assembler 44 over a signal path 72 and a "retry" counter 74 coupled to the frame CRC and sequence checker 65 over a path 76 which also extends to the frame assembler 44. The counter 74 is coupled to a memory storage array 78 over signal path 80. A frame length adjuster 73 receives signals from the counter 70 over path 82 and from the array 78 over path 84. The adjuster 73 also provides a reset signal to the counter 74 over path 86, a shift signal to the array 78 over path 88 and a frame length signal to the frame assembler 44 over path 90.

In operation, digital data is received from the interfaced DTE via interface 40 and path 43 and buffered in the data buffer 42 for use by the frame assembler 44. The frame assembler 44 extracts from the data buffer 42 the data needed to assemble a frame (see FIG. 2) in accordance with the frame length setting 90 provided by the adjuster 73. Each assembled frame is provided to the transmitter 48 over path 50 for transmission (sent) over the communication line via path 52 and coupler 54. In turn, framed data is received from the communication line in the receiver 56 via coupler 54 and path 60 and provided to the frame and the frame CRC and sequence checker 65 to strip off the overhead and pass the data to the data buffer 64 over path 66. The DTE interface 40 extracts the data from the buffer 64 over path 68 and converts it to the proper format for transmission to the associated DTE. In this manner, data is exchanged between the DTE and communication line.

In accordance with the present invention, the communication line is monitored by the receiver 56 and disassembler 58 and the frame CRC and sequence checker 65 upon each data frame transmission for a retransmit indication which corresponds to an unacceptable data frame transmission. This retransmit indication may be in the form of a retransmit signal received from the communication line via receiver 56 and the disassembler 58 and the frame CRC and sequence checker 65 or in the alternative, it may be a lack of acknowledgement signal within a predetermined time period. In either case, the retransmit indication is conducted over signal path 76 to the frame assembler 44 to cause it and the transmitter 48 to retransmit the data frame in response thereto. In addition, the retransmit indication is counted by the counter 74. Concurrently, the counter 70 counts each frame assembled by the assembler 44 for transmission over the communication line.

There are certain drawbacks associated with the use of counters such as the send counter 70 and retry counter 74, for example. One drawback is that the counters can only store a finite number of counts; what happens when the values reach the limit of the counters' capacity? Another problem is in regard to response time. When the communication line becomes more or less noisy, any technique for adjusting the frame length should respond within a given period of time and adjust the frame length accordingly. However, if the values in the counters are large, the frame length adjuster may be slow to respond to changes and the response time may increase the longer the DCA is on line and counting.

The instant embodiment solves these drawbacks by providing a "sliding window" of a predetermined number of frames (n) for accumulating retransmit or retry indications for use in determining or adjusting the frame length as described supra. In the present embodiment, a new frame length is set for every group of m frames that are assembled and transmitted. Accordingly, the memory array 78 is designed to include n/m storage locations for storing the number count in the retry counter 74 for each group m of frames. That is, each storage location in the memory array 78 holds a number count which indicates the number of frames that were retransmitted during the sending of the group of m frames. A total retry number count for the sliding window is formulated in the adjuster 72 by combining the individual counts of the storage locations of the memory array 78.

More specifically, the send counter 70 receives a signal for accumulation from the assembler 44 over signal path 72 for each assembled frame for transmission or retransmission. The accumulated count of counter 70 is provided to the adjuster 73 over path 82 for use by the adjuster 73 in grouping the m frames being transmitted. After each group of m frames transmitted, the adjuster 73 stores the accumulated count of the retry counter 74 via path 80 in an unfilled storage location of the memory array 78, then resets the counter 74 using a reset signal over path 86 such that the counter 74 may start counting retransmit indications over the next group of m frames. In addition, the adjuster 73 combines the contents of the storage registers of the memory array 78 by accessing the storage registers through a shifting control via path 88 such that the contents of each register is provided sequentially to the adjuster 73 over path 84. Using the total count of retransmit indications, the predetermined number n of the sliding window and the frame overhead in accordance with the equation (4) found hereabove, the adjuster 73 sets a new frame length which is provided to the frame assembler 44 over path 90.

When all of the storage locations of the memory array 78 become filled, then for an instant group of m frames, the oldest stored number count in the memory array 78 is removed therefrom to make available a storage location for storing the number count in the retry counter 74 corresponding to the instant group m. In the present embodiment, this is performed by a shifting operation under control of the adjuster 73. Thus, only the number counts of the counter 74 corresponding to the immediately preceding n/m groups of data frames are storable in the memory array 78. Accordingly, a new frame length setting is determined by the adjuster 73 after each group of m frames using the total number count of retransmit indications from the memory array 78.

After n frames have been sent, the number of frames accumulated in the counter 70 may remain constant at n to match the retry sliding window history. The instant embodiment also employs checks to prevent the new frame length from exceeding a predetermined maximum frame length, and to prevent overflow or underflow errors in any of the previously described calculations. For example, if the total retransmit indication count accumulated from the individual counts of the memory array 78 is below a predetermined minimum number count or is zero, the frame length is set to the predetermined maximum frame length, thereby bypassing the frame length adjustment computation by the adjuster 73.

Still further, several factors should be considered in picking the number of frames n for the sliding window and the group of m frames. In this regard, the period of the sliding window of retry indication data depends upon n and upon the transmission speed. For example, the larger n, the longer the response time of the adjustment technique. Too small a selection of n or too large a selection of m will result in a "jerky" type of response. The smaller selection of m, the more computations will be performed. Also, the larger the ratio of n/m, the larger the memory array for storing the individual retry counts of the counter 74. And, if integer arithmetic is used, n should be large enough to provide a sufficient amount of resolution in the calculations of the frame length setting. In the present embodiment, assuming a 2400 bps modem, n may be set to 128 and m set to 4. The size of the memory array includes 128/4 or 32 storage locations. This selection of n and m provides the adjustment technique with a reasonable amount of resolution using integer arithmetic, but does not incur too heavy a penalty in storage requirements. In addition, the time period of the sliding window is approximately two minutes if 256-octet frames are used.

Figure 4:
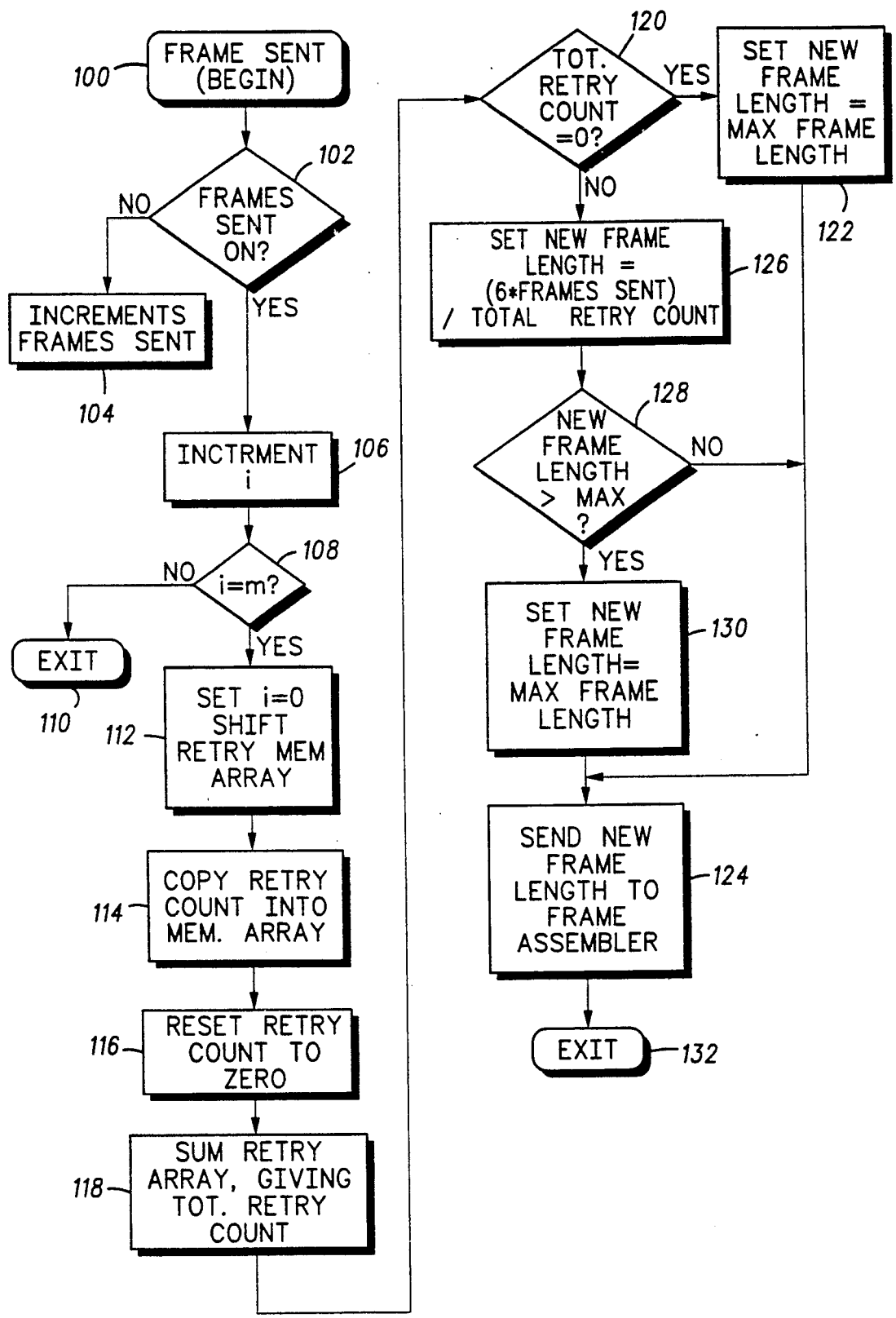
FIG. 4 is a flow chart for use in describing the technique of determining an optimum frame length.

While the present invention has been described in connection with the functional block diagram embodiment of FIG. 3, it is understood that such functions may be implemented in a conventional programmed digital signal processor or microcomputer, for example. In this regard, the flow chart of FIG. 4 represents a suitable software embodiment of the present invention for use in connection with such a programmed processor or microcontroller device. Referring to FIG. 4, as each frame is assembled and transmitted (sent) in accordance with the instructions of block 100, the number of frames sent are accumulated in a register (counter 70). The accumulated count of the sent frames register is compared with a predetermined number n representing the chosen number of frames for the sliding window in the decisional block 102. If the accumulated frame count does not exceed n, the count of the frames sent register is incremented by the block 104. If the accumulated count of the register exceeds n, the block 104 operation is bypassed. In either case, program execution continues in block 106 where an index i, representing the count used for determining the group of m frames, is incremented. Thereafter in the decisional block 108, it is determined whether or not an individual group of m frames has been sent. If not, the program is exited at block 110. Otherwise, a positive indication from the decisional block 108 causes the index i to be reset to zero and a shifting of the storage locations of the memory array 78 in block 112. Next, in block 114, the contents of the counter 74 are copied into a storage location of the memory array 78 and thereafter, in block 116, the counter 74 is reset to zero. The individual counts stored in the memory array 78 are summed to obtain a total number count of retransmit indications in the block 118.

If the total number count obtained from block 118 is equal to zero as determined by the decisional block 120, program execution departs to block 122 wherein the new frame length is set to a predetermined maximum frame length and program execution continues at block 124. A negative decision of block 120 causes the new frame length to be set in accordance with the equation (5) described hereabove utilizing the total retry count obtained from block 118, the frame overhead which for the instant example is 6, and the predetermined number of frames n of the sliding window in block 126. In the decisional block 128 and instructional block 130, the new frame length computed in 126 is limited to a predetermined maximum frame length. Next, the new frame length setting is provided to the frame assembler 44 by the instructions of block 124 and the program is exited at 132.

One of the advantages of the foregoing described frame length adjustment technique is its simplicity as illustrated by the software embodiment for use in a microprocessor system of data communications apparatus. In this connection, the frame length adjustment technique is easy to code into assembly language for execution in the microprocessor and should execute rapidly, and not require complex calculations. Spending a great deal of time executing a complex algorithm is counterproductive to data communication apparatus in that it causes delays in sending frames out which results in a decreased throughput of data communications. Another advantage is that the software embodiment is compatible with other similar data communication apparatus which may not embody the present invention albeit, the benefits thereof would only apply in one direction, i.e. to data that is transmitted from the data communications apparatus embodying the present invention to a system not embodying the invention, and not vice versa.

While the present invention has been described in connection with a preferred embodiment hereabove, it is understood that modifications, additions and deletions may be made thereto or even an equivalent embodiment substituted therefor without deviating from the principles of the present invention. Accordingly, the present invention should not be limited to any single embodiment but rather construed in breadth and scope in accordance with the recitation of the appended claims.

What is claimed is:

1. Data communication apparatus DCA, interfaceable with data terminal apparatus and a communication medium for exchanging digital data in the form of data frames between the data terminal apparatus and communication medium, each data frame including data frame overhead, said data communication apparatus comprising:

means for interfacing with said data terminal apparatus to receive data therefrom to be transmitted over said communication medium;

means for assembling said received data to form assembled data frames, each of the assembled data frames having a length that is adjustable;

means for transmitting the assembled data frames over the communication medium;

error determining means coupled to the communication medium for determining an error rate of the communication medium; and means coupled to the error determining means for adjusting the length of the assembled data frames based on said error rate, wherein the error determining means includes means for determining a number of unacceptable transmissions of assembled data frames over the communication medium;

and wherein the adjusting means includes means for adjusting the length of the assembled data frames based on said number of unacceptable transmissions of assembled data frames over the communication medium, and wherein the determining means includes;

means for monitoring the communication medium for a retransmit indication corresponding to said unacceptable assembled data frame transmission, thus forming a number of retransmit inductions, said monitoring means causing the assembling means and transmitting means to retransmit the assembled data frame in response to its associated retransmit indication;

and wherein the adjusting means includes means for adjusting the length of the assembled data frames based on the number of retransmit indications, the number of assembled data frames transmitted and the data frame overhead, and wherein the adjusting means includes:

first counting means responsive to the assembling means for determining the number of assembled data frames assembled for transmission;

second counting means responsive to the error determining means for determining the number of retransmit indications; and setting means for setting a new assembled data frame length for data transmission based on the number of assembled data frames assembled for transmission and the number of retransmit indications.

2. Data communication apparatus interfaceable with data terminal apparatus and a communication medium for exchanging digital data int he form of data frames between the data terminal apparatus and communication medium, each data frame including data frame overhead, said data communication apparatus comprising;

means for interfacing with sad data terminal apparatus to receive data therefrom to be transmitted over said communication medium;

means for assembling said received data to form assembled data frames, each of the assembled data frames having a length that is adjustable;

means for transmitting the assembled data frames over the communication medium;

error determining means coupled to the communication medium for determining an error rate of the communication medium; and means coupled to the error determining means for adjusting the length of the assembled data frames based on said error rate, wherein the error determining means includes means for determining a number of unacceptable transmissions of assembled data frames over the communication medium;

and wherein the adjusting mans includes means for adjusting the length of the assembled data frames based on said number of unacceptable transmissions of assembled data frames over the combination medium, and wherein the determining means includes;

means for monitoring the communication medium for a retransmit indication corresponding to said unacceptable assembled data frame transmission, thus forming a number of retransmit indications, said monitoring means causing the assembling means and transmitting means to retransmit the assembled data frame in response to its associated retransmit indication;

and wherein the adjusting means includes means for adjusting the length of the assembled data frames based on the number of retransmit indication, the number of assembled data frames transmitted and the data frame overhead, and wherein the adjusting means includes:

means for establishing a sliding window of a predetermined number n of assembled data frames assembled for transmission;

counting means for determining the number of retransmit indication over each predetermined group m of assembled data frames of said sliding window;

means for combining the number of counts of the counting means corresponding to each group m of the sliding window thus forming a total number of counts of retransmit indication corresponding to the sliding window; and means for setting a new assembled data frame length for data transmission based on said total number of counts, the predetermined number n of the sliding window, and the data frame overhead;

wherein $n \geq m \geq 1$.

3. The DCA in accordance with claim 2 wherein the adjusting means further includes storing means including n/m storage locations for storing the corresponding number of counts of the counting means;

and wherein the combining means combines the number of counts of the storing means for the sliding window to obtain the total number of counts.

4. The DCA in accordance with claim 3 including a controlling means for casing the number count of the counting means corresponding to an instant group m of assembled data frames to be stored in an unfilled location of the storage means until all of the locations thereof are filled, and thereafter, for causing the oldest stored number of counts to be removed from the storing means to make available a storage location for storing the number of counts of the instant group m, whereby only the number of counts of the counting means corresponding to the immediately preceding n/m groups of assembled data frames are storable in the storing means.

5. The DCA in accordance with claim 2 including a controlling means for causing the combining means and setting means to perform their respective functions for each group m of assembled data frames such that a new total number of counts of retransmit indications is obtained and a new assembled data frame length is settable based thereon for each group m of assembled data frames.

6. The DCA in accordance with claim 2 wherein the setting means includes means for limiting the setting of the new assembled data frame length to a predetermined maximum assembled data frame length.

7. The DCA in accordance with claim 2 wherein the setting means includes means for setting the new assembled data frame length to a predetermined maximum assembled data frame length when the corresponding obtained total number count is below a predetermined minimum number of counts.

8. The DCA in accordance with claim 2 wherein the setting means includes means for setting the new assembled data frame length to a predetermined maximum assembled data frame length when the corresponding obtained total number of counts is zero.

9. In a data communication apparatus interfaceable with data terminal apparatus and a communication medium for exchanging digital data int he form of data frames between the data terminal apparatus and communication medium, each data frame including data frame overhead, a method of adjusting the length of aid data frames comprising the steps of:

interfacing with the data terminal apparatus to receive data therefrom to be transmitted over the communication medium;

assembling the received data to from assembled data frames, each of the assembled data frames having a length that may be adjusted;

transmitting the assembled data frames over the communication medium;

determining an error rate of the communication medium; and adjusting the length of the assembled data frames based on said error rate;

wherein the step of determining includes a step of determining a number of unacceptable transmissions of assembled data frames over the communication medium;

and wherein the step of adjusting includes a step of adjusting the length of the assembled data frames based on said number of unacceptable transmissions; and including the steps of:

monitoring the communication medium for a retransmit indication corresponding to an unacceptable assembled data frame transmission; and effecting the assembling step and transmitting step to retransmit the assembled data frame in response to its associated retransmit indication;

and wherein the step of adjusting includes a step of adjusting the length of the assembled data frames based on the retransmit indications, the assembled data frames transmitted and the data frame overhead; and wherein the adjusting step includes the steps of:

determining the number of assembled data frames assembled for transmission;

determining the number of retransmit indications; and setting a new assembled data frame length for data transmission based on the total number of counts of assembled data frames and the number of retransmit indications.

10. In a data communication apparatus interfaceable with data terminal apparatus and a communication medium for exchanging digital data int he form of data frames between the data terminal apparatus and communication medium, each data frame including data frame overhead, a method of adjusting the length of said data frames comprising the steps of:

interfacing with the data terminal apparatus to receive data therefrom to be transmitted over the communication medium;

assembling the received data to form assembled data frames, each of the assembled data frames having a length that may be adjusted;

transmitting the assembled data frames over the communication medium;

determining an error rate of the communication medium; and adjusting the length of the assembled data frames based on said error rate;

wherein the step of determining includes a step of determining a number of unacceptable transmissions of assembled data frames over the communication medium;

and wherein the step of adjusting includes a step of adjusting the length of the assembled data frames based on said number of unacceptable transmissions; and including the steps of:

monitoring the communication medium for a retransmit indication corresponding to an unacceptable assembled data frame transmission; and effecting the assembling step and transmitting step to retransmit the assembled data frame in response to its associated retransmit indication;

and wherein the step of adjusting includes a step of adjusting the length of the assembled data frames based on the retransmit indications, the assembled data frames transmitted and the data frame overhead; and wherein the step of adjusting includes the steps of:

establishing a sliding window of a predetermined number n of assembled data frames assembled for transmission;

counting the number of retransmit indications over each predetermined group m of assembled data frames of aid sliding window;

combining the total number of counts of the counting step corresponding to each group m of the sliding window to obtain a total number of counts of retransmit indications corresponding to the sliding window; and setting a new data frame length for data transmission based on said total number of counts, the predetermined number n of the sliding window, and the data frame overhead;

wherein $n \geq m \geq 1$.

11. The method in accordance with claim 10 wherein the adjusting step further includes a step of storing the number of counts of the counting step in n/m storage locations of a storing means;

and wherein the combining step includes a step of combining the total number of counts of the storing means for the sliding window to obtain the total number of counts.

12. The method in accordance with claim 11 including the steps of:

causing the number count of the counting step corresponding to an instant group m of assembled data frames to be stored in an unfilled location of the storing means until all of the locations thereof are filled;

and thereafter, causing the oldest stored number of counts to be removed from the storing means to make available a storage location for storing the number of counts of the instant group m.

whereby only the number of counts of the counting step corresponding to the immediately preceding n/m groups of assembled data frames are storable in the storing means.

13. The method in accordance with claim 10 including the step of causing the combining step and setting step to perform their respective operations for each group m of assembled data frames such that a new total number of counts of retransmit indications is obtained and a new assembled data frame length is settable based thereon for each group m of assembled data frames.

14. The method in accordance with claim 10 wherein the setting step includes a step of limiting the setting of the new assembled data frame length to a predetermined maximum frame assembled data length.

15. The method in accordance with claim 10 wherein the setting step includes a step of setting the new assembled data frame length to a predetermined maximum assembled data frame length when the corresponding obtained total number count is below a predetermined minimum number of counts.

16. The method in accordance with claim 10 wherein the setting step includes a step of setting the new assembled data frame length to a predetermined maximum assembled data frame length when the corresponding obtained total number of counts is zero.

* * * * *